United States Patent
Zhang

(10) Patent No.: US 9,044,656 B2
(45) Date of Patent: Jun. 2, 2015

(54) GOLF TROLLEY HAVING STEERABLE FRONT WHEEL

(71) Applicant: Ningbo Wentai Sport Equipment Co., Ltd., Ningbo (CN)

(72) Inventor: Sheng Zhang, Ningbo (CN)

(73) Assignee: NINGBO WENTAI SPORT EQUIPMENT CO., LTD., Ningbo (CN)

( * ) Notice: Subject to any disclaimer, the term of this patent is extended or adjusted under 35 U.S.C. 154(b) by 0 days.

(21) Appl. No.: 14/260,262

(22) Filed: Apr. 23, 2014

(65) Prior Publication Data

US 2014/0232077 A1 Aug. 21, 2014

Related U.S. Application Data

(63) Continuation-in-part of application No. PCT/CN2013/000071, filed on Jan. 23, 2013.

(30) Foreign Application Priority Data

Oct. 12, 2012 (CN) .................... 2012 2 0523714 U

(51) Int. Cl.
*B62B 3/12* (2006.01)
*A63B 55/08* (2006.01)

(52) U.S. Cl.
CPC ........... *A63B 55/08* (2013.01); *B62B 2301/046* (2013.01)

(58) Field of Classification Search
CPC .... B62B 5/0422; B62B 5/0438; B62B 9/085; B62B 9/08
USPC ............... 280/651, 62, 47.34, DIG. 6, 47.38; 188/19, 20
See application file for complete search history.

(56) References Cited

U.S. PATENT DOCUMENTS

| | | | | | |
|---|---|---|---|---|---|
| 4,349,938 | A | * | 9/1982 | Fontana | 16/35 R |
| 4,759,098 | A | * | 7/1988 | Ko | 16/29 |
| 4,847,945 | A | * | 7/1989 | Schwartz et al. | 16/30 |
| 5,669,624 | A | * | 9/1997 | Eichhorn | 280/642 |
| 5,713,585 | A | * | 2/1998 | Curtis et al. | 280/47.38 |
| 6,315,309 | B1 | * | 11/2001 | Li et al. | 280/47.38 |
| 6,510,927 | B1 | * | 1/2003 | Wu | 188/31 |
| 6,584,641 | B1 | * | 7/2003 | Milbredt | 16/35 R |
| 6,671,926 | B2 | * | 1/2004 | Huang | 16/35 R |
| 6,871,380 | B2 | * | 3/2005 | Chen | 16/35 R |
| 7,083,175 | B1 | * | 8/2006 | Liu | 280/47.38 |
| 7,210,690 | B2 | * | 5/2007 | Tan | 280/47.38 |
| 7,213,818 | B2 | * | 5/2007 | Chang | 280/47.38 |
| 7,258,353 | B2 | * | 8/2007 | Liao | 280/47.38 |
| 7,364,171 | B2 | * | 4/2008 | Hu | 280/47.38 |
| 7,490,848 | B2 | * | 2/2009 | Wu et al. | 280/657 |
| 7,506,890 | B2 | * | 3/2009 | Chen | 280/647 |
| 8,292,327 | B2 | * | 10/2012 | Araya Moreno et al. | 280/771 |
| 2004/0226134 | A1 | * | 11/2004 | Chen | 16/35 R |
| 2005/0121865 | A1 | * | 6/2005 | Liao | 280/38 |
| 2005/0140105 | A1 | * | 6/2005 | Hernandez | 280/62 |
| 2014/0232077 | A1 | * | 8/2014 | Zhang | 280/47.34 |

* cited by examiner

*Primary Examiner* — Jeffrey J Restifo
(74) *Attorney, Agent, or Firm* — Matthias Scholl P.C.; Matthias Scholl

(57) ABSTRACT

A golf trolley including: a frame assembly, a handrail, a rotating device, a front wheel assembly, and a locking device. The handrail is disposed on the frame assembly. The rotating device is disposed on a front end of the frame assembly. The front wheel assembly is rotatably mounted on the rotating device. The locking device is disposed on the handrail. The locking device is connected to the rotating device for controlling the degree of rotation of the front wheel assembly.

7 Claims, 4 Drawing Sheets

GOLF TROLLEY HAVING STEERABLE FRONT WHEEL

CROSS-REFERENCE TO RELATED APPLICATIONS

This application is a continuation-in-part of International Patent Application No. PCT/CN2013/000071 with an international filing date of Jan. 23, 2013, designating the United States, now pending, and further claims foreign priority benefits to Chinese Patent Application No. 201220523714.7 filed Oct. 12, 2012. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 14781 Memorial Drive, Suite 1319, Houston, Tex. 77079.

BACKGROUND OF THE INVENTION

1. Field of the Invention

The invention relates to an improved golf trolley.

2. Description of the Related Art

A conventional golf trolley often has a front wheel that is not steerable. In those having a steerable front wheel, a locking device of the front wheel is often arranged near the front wheel, and the user is required to be in front of the golf trolley to operate the locking device for locking or releasing the front wheel, thereby resulting in inconvenience.

SUMMARY OF THE INVENTION

In view of the above-described problems, it is one objective of the invention to provide an improved golf trolley that uses a locking device disposed on a handrail to control the rotation of a front wheel assembly disposed on a rotating device whereby steering the golf trolley.

To achieve the above objective, in accordance with one embodiment of the invention, there is provided a golf trolley comprising a frame assembly and a handrail disposed on the frame assembly. A rotating device is disposed on a front end of the frame assembly. A front wheel assembly is rotatably mounted on the rotating device. A locking device is disposed on the handrail. The locking device is connected to the rotating device for controlling the degree of rotation of the front wheel assembly.

In a class of this embodiment, the golf trolley of the invention further comprises the following additional technical features.

In a class of this embodiment, the rotating device comprises: an anchor disposed on the frame assembly, and a slide capable of sliding inside the anchor. The slide is connected to the locking device; the slide is provided with an anchor pin; and the anchor pin is controlled by the slide to connect to the front wheel assembly.

In a class of this embodiment, the slide comprises a skewed slot; the anchor pin comprises a chute; the slide is connected to the anchor pin by introducing a fixed axle to pass through the skewed slot and the chute.

In a class of this embodiment, the anchor pin comprises a cavity; a return spring is disposed in the cavity; and one end of the return spring leans against the fixed axle.

In a class of this embodiment, the locking device comprises: a handle arranged on the handrail, and a brake steel line connected to the handle. The brake steel line is provided with a fixed block. The fixed block is locked inside the slide. A spring is arranged between the slide and the brake steel line.

In a class of this embodiment, the front wheel assembly comprises a snap fastener comprising a reset spring. A revolving shaft is mounted on the anchor. The front wheel assembly is mounted on the anchor by locking the snap fastener on the revolving shaft.

In a class of this embodiment, the revolving shaft comprises a neck, the snap fastener is provided with a bayonet, and the bayonet is locked by the neck.

In a class of this embodiment, the snap fastener is provided with a limit slot, and the snap fastener is mounted on the anchor by introducing a pin to pass through the limit slot.

Advantages of the golf trolley of the invention are summarized as follows: by employing the locking device arranged on the handrail to control the rotation of the front wheel assembly disposed on the rotating device, whereby controlling the moving direction of the golf trolley, the invention tackles the problem in the prior art that the user is required to be in front of the golf trolley to operate the locking device for the purpose of locking or releasing the front wheel assembly, and is capable of conveniently conducting the lock or release of the front wheel assembly in the process of pushing the golf trolley.

DETAILED DESCRIPTION OF THE EMBODIMENTS

Figure 1:
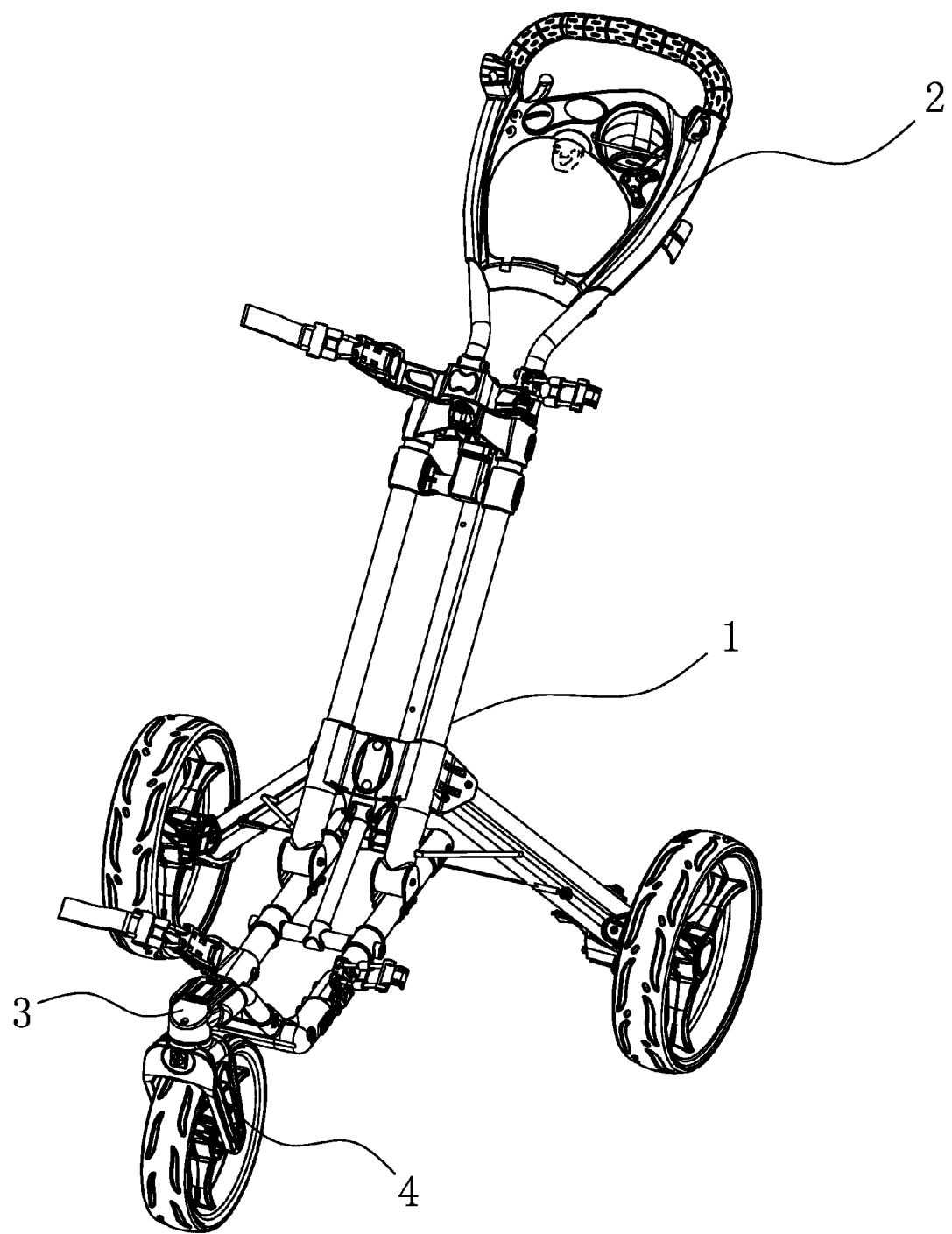
FIG. 1 is a structure diagram of a golf trolley of the invention.

For further illustrating the invention, experiments detailing an improved golf trolley are described hereinbelow combined with the drawings.

As shown in FIGS. 1-4, a golf trolley of the invention comprises a frame assembly 1 and a handrail 2 disposed on the frame assembly 1. A rotating device 3 is disposed on a front end of the frame assembly 1. A front wheel assembly 4 is rotatably mounted on the rotating device 3. A locking device 5 is disposed on the handrail 2, and the locking device 5 is connected to the rotating device 3 for controlling the degree of rotation of the front wheel assembly 4. By employing the locking device 5 arranged on the handrail 2 to control the position of front wheel assembly 4 disposed on the rotating device 3, thereby controlling the moving direction of the golf trolley, the invention tackles the problem in the prior art that the user was required to be in front of the golf trolley to operate the locking device for the purpose of locking or releasing the front wheel assembly, and is capable of conveniently conducting the lock or release of the front wheel assembly in the process of pushing the golf trolley.

Figure 2:
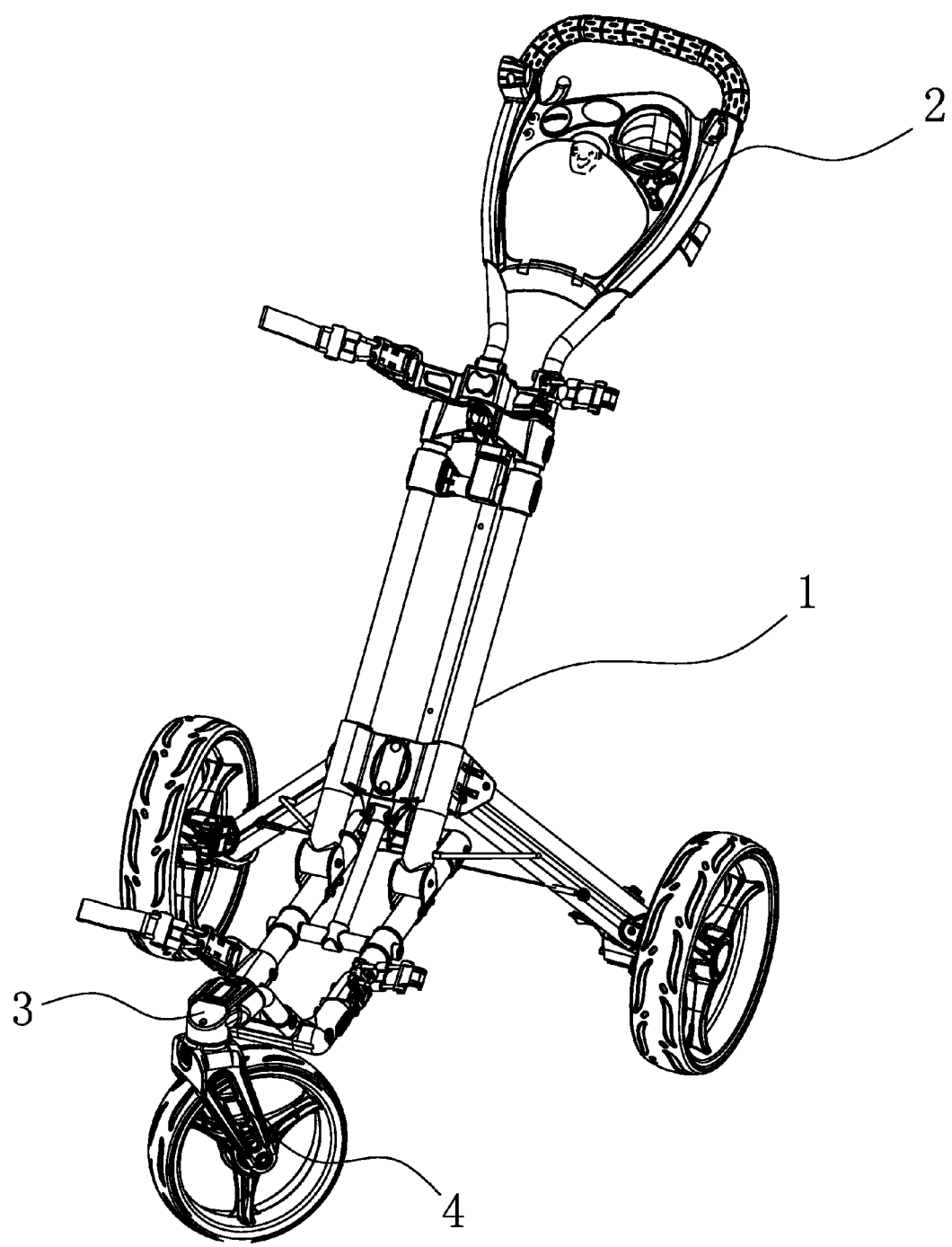
FIG. 2 is a state diagram of a golf trolley when a front wheel assembly is released.
Figure 3:
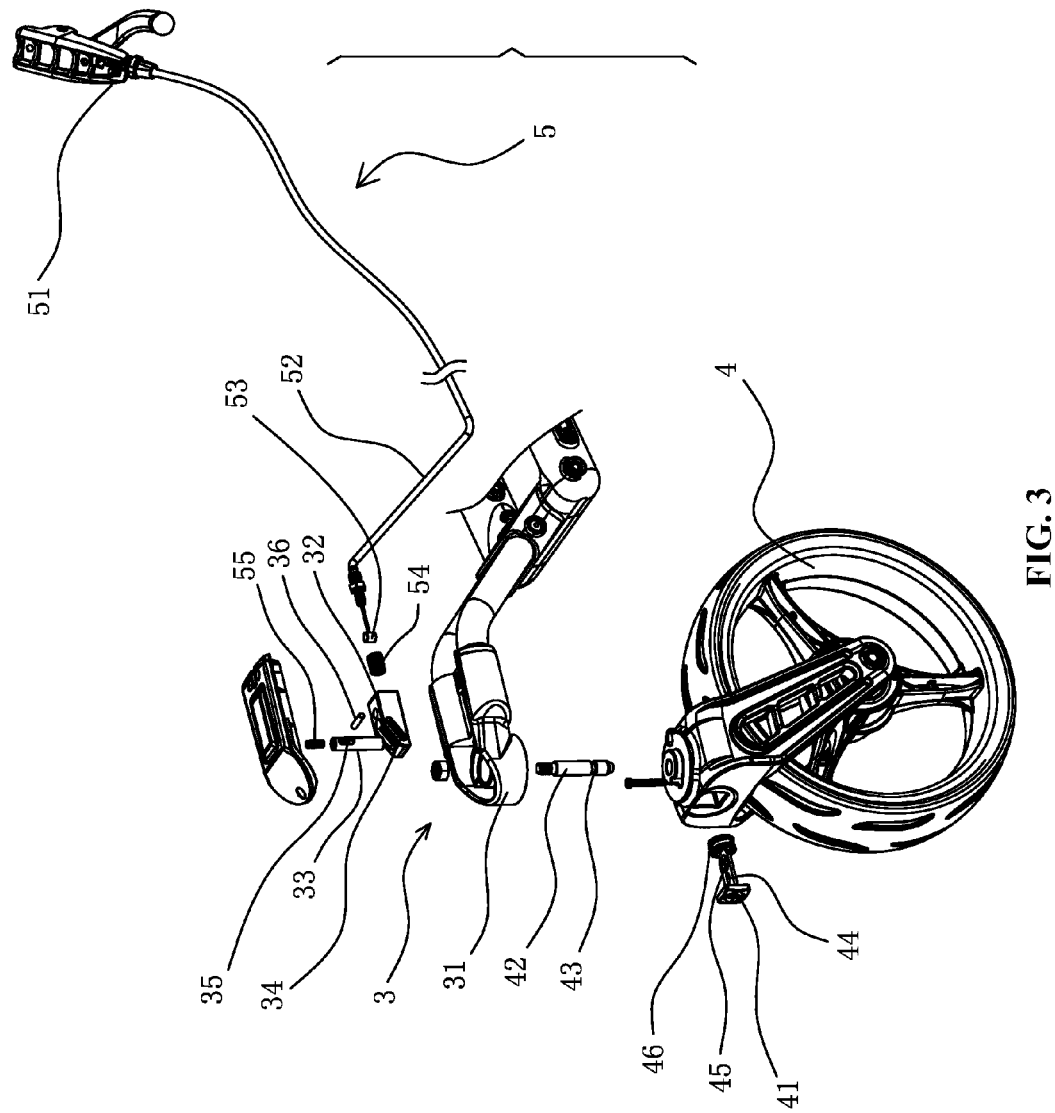
FIG. 3 is an exploded view of a rotating device of the invention.
Figure 4:
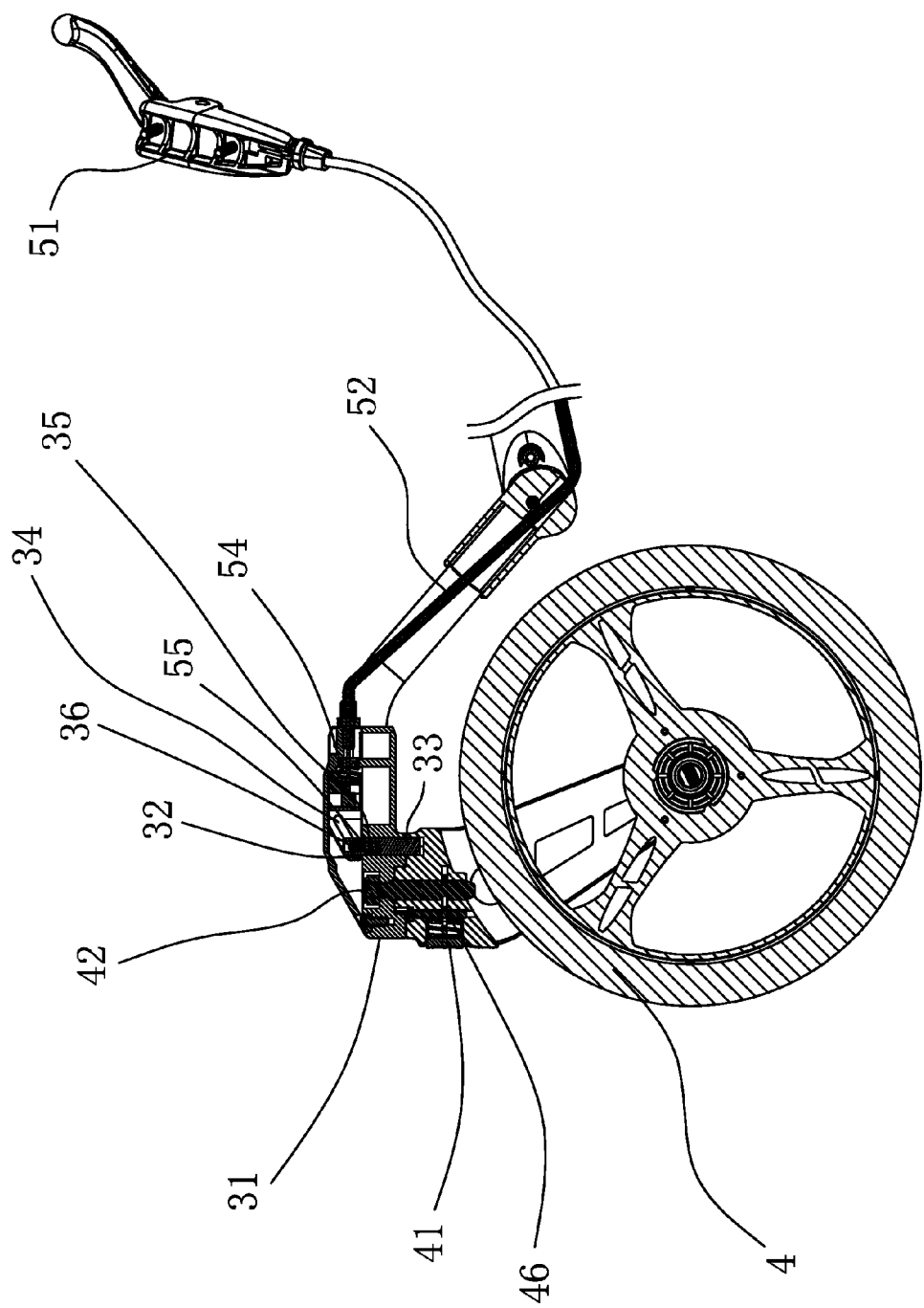
FIG. 4 is a cross-sectional view of a rotating device of the invention.

As shown in FIGS. 2-4, the rotating device 3 of the golf trolley of the invention comprises an anchor 31 disposed on the frame assembly 1 and a slide 32 that is capable of sliding in the anchor 31. The slide 32 is connected to the locking device 5 and is provided with an anchor pin 33. The anchor pin 33 is controlled by the slide 32 to connect to the front wheel assembly 4. The slide 32 comprises a skewed slot 34; the anchor pin 33 comprises a chute 35; and the slide 32 is connected to the anchor pin 33 by introducing a fixed axle 36 to pass through the skewed slot 34 and the chute 35. To lock the front wheel assembly 4 in the moving process of the golf trolley, the locking device 5 disposed on the handrail 2 is regulated, the slide 32 is controlled by the locking device 5 to move within the anchor 31. The fixed axle 36 is driven by the skewed slot 34 disposed on the slide 32 to slide downwardly inside the chute 35 disposed on the anchor pin 33 during the sliding process of the slide 32, whereby driving the anchor pin 33 to insert into the front wheel assembly 4 for locking the rotation of the front wheel assembly 4.

As shown in FIGS. 2-4, the locking device 5 of the invention comprises a handle 51 disposed on the handrail 2 and a brake steel line 52 connected to the handle 51. The brake steel line 52 is provided with a fixed block 53 locked inside the slide 32. A spring 54 is arranged between the slide 32 and the brake steel line 52. The fixed block 53 comprises a cavity, and a return spring 55 is disposed in the cavity. One end of the return spring 55 leans against the fixed axle 36. To rotate the front wheel assembly 4 in the moving process of the golf trolley, the handle 51 of the locking device 5 is regulated, the slide 32 is driven to slide by the handle 51 via the fixed block 53 of the brake steel line 52 locked inside the slide 32. The elastic force of the spring 54 arranged between the slide 32 and the brake steel line 52 is utilized to push the slide 32 to move, and the anchor pin 33 is separated from the front wheel assembly 4 by the return spring 55 inside the anchor pin 33, thereby realizing the rotation of the front wheel assembly 4.

As shown in FIGS. 3-4, the front wheel assembly 4 of the invention comprises a snap fastener 41 comprising a reset spring 46; the anchor 31 comprises a revolving shaft 42; and the front wheel assembly 4 is mounted on the anchor 31 by locking the snap fastener 41 on the revolving shaft 42. The revolving shaft 42 comprises a neck 43, the snap fastener 41 is provided with a bayonet 44, and the bayonet 44 is locked inside the neck 43. The snap fastener 41 is provided with a limit slot 45, and the snap fastener 41 is mounted on the anchor 31 by introducing a pin to pass through the limit slot 45. The front wheel assembly 4 is provided with the snap fastener 41, the anchor 31 is provided with the revolving shaft 42, and the front wheel assembly 4 is mounted on the anchor 31 by locking the snap fastener 41 on the revolving shaft 42, thereby allowing the user to maintain and change the front wheel assembly 4 conveniently.

The structure and the working principle of the golf trolley are known to the public in the technical field, and the improved golf trolley provided by the invention only relates to the above components without changes to other components. Thus, structures of the above components of the golf trolley are specifically illustrated herein, and descriptions about structures and working principles of other components of the golf trolley are unnecessary. The improved golf trolley of the invention can be implemented on the basis of instructions of the invention.

The invention claimed is:

1. A golf trolley, comprising:
 a) a frame assembly;
 b) a handrail, the handrail being disposed on the frame assembly;
 c) a rotating device;
 d) a front wheel assembly; and
 e) a locking device;
wherein
 the rotating device is disposed on a front end of the frame assembly;
 the front wheel assembly is rotatably mounted on the rotating device;
 the locking device is disposed on the handrail;
 the locking device is connected to the rotating device for controlling a degree of rotation of the front wheel assembly;
 the rotating device comprises: an anchor disposed on the frame assembly, and a slide capable of sliding inside the anchor;
 the slide is connected to the locking device;
 the slide is provided with an anchor pin; and
 the anchor pin is controlled by the slide to connect to the front wheel assembly.

2. The golf trolley of claim 1, wherein the slide comprises a skewed slot; the anchor pin comprises a chute; the slide is connected to the anchor pin by introducing a fixed axle to pass through the skewed slot and the chute.

3. The golf trolley of claim 2, wherein the anchor pin comprises a cavity; a return spring is disposed in the cavity; and one end of the return spring leans against the fixed axle.

4. The golf trolley of claim 1, wherein the locking device comprises: a handle arranged on the handrail, and a brake steel line connected to the handle; the brake steel line is provided with a fixed block; the fixed block is locked inside the slide; and a spring is arranged between the slide and the brake steel line.

5. The golf trolley of claim 1, wherein
 the front wheel assembly comprises a snap fastener comprising a reset spring;
 a revolving shaft is mounted on the anchor; and
 the front wheel assembly is mounted on the anchor by locking the snap fastener on the revolving shaft.

6. The golf trolley of claim 5, wherein the revolving shaft comprises a neck, the snap fastener is provided with a bayonet, and the bayonet is locked by the neck.

7. The golf trolley of claim 5, wherein the snap fastener is provided with a limit slot, and the snap fastener is mounted on the anchor by introducing a pin to pass through the limit slot.

* * * * *